(12) United States Patent
Qian et al.

(10) Patent No.: US 10,319,363 B2
(45) Date of Patent: Jun. 11, 2019

(54) AUDIO HUMAN INTERACTIVE PROOF BASED ON TEXT-TO-SPEECH AND SEMANTICS

(75) Inventors: Yao Qian, Beijing (CN); Frank Kao-Ping Soong, Beijing (CN); Bin Benjamin Zhu, Edina, MN (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 13/399,496

(22) Filed: Feb. 17, 2012

(65) Prior Publication Data

US 2013/0218566 A1   Aug. 22, 2013

(51) Int. Cl.
| | | |
|---|---|---|
| *G10L 13/033* | (2013.01) | |
| *G10L 21/003* | (2013.01) | |
| *G10L 15/00* | (2013.01) | |

(52) U.S. Cl.
CPC .... *G10L 13/033* (2013.01); *G06F 2221/2133* (2013.01); *G10L 15/00* (2013.01); *G10L 21/003* (2013.01)

(58) Field of Classification Search
USPC ................................................. 704/258, 260
See application file for complete search history.

(56) References Cited

U.S. PATENT DOCUMENTS

| | | | |
|---|---|---|---|
| 6,195,698 B1 | 2/2001 | Lillibridge et al. | |
| 7,680,891 B1* | 3/2010 | Pongsajapan | G06Q 10/107 709/206 |

(Continued)

FOREIGN PATENT DOCUMENTS

| | | |
|---|---|---|
| CN | 1758330 A | 4/2006 |
| CN | 101005528 A | 7/2007 |

(Continued)

OTHER PUBLICATIONS

Improving Auditory Captcha Security, Retrieved at ldrum.lib.umd.edulbitstream1190318666/3/Auditory+Captcha+Security+Final.pdf>>, Proceedings of Institute for Systems Research Technical Reports, Nov. 5, 2008, pp. 1-17.*

(Continued)

*Primary Examiner* — Thuykhanh Le (74) *Attorney, Agent, or Firm* — Alleman Hall Creasman & Tuttle LLP (57) ABSTRACT

The text-to-speech audio HIP technique described herein in some embodiments uses different correlated or uncorrelated words or sentences generated via a text-to-speech engine as audio HIP challenges. The technique can apply different effects in the text-to-speech synthesizer speaking a sentence to be used as a HIP challenge string. The different effects can include, for example, spectral frequency warping; vowel duration warping; background addition; echo addition; and varying the time duration between words, among others. In some embodiments the technique varies the set of parameters to prevent using Automated Speech Recognition tools from using previously used audio HIP challenges to learn a model which can then be used to recognize future audio HIP challenges generated by the technique. Additionally, in some embodiments the technique introduces the requirement of semantic understanding in HIP challenges.

20 Claims, 5 Drawing Sheets

(56) References Cited

U.S. PATENT DOCUMENTS

| | | | | |
|---|---|---|---|---|
| 7,945,952 | B1* | 5/2011 | Behforooz | G06F 21/316 |
| | | | | 713/155 |
| 8,036,902 | B1* | 10/2011 | Strom | G06F 21/31 |
| | | | | 704/275 |
| 8,904,517 | B2* | 12/2014 | Hariharan | H04H 60/48 |
| | | | | 726/17 |
| 8,925,057 | B1* | 12/2014 | Ansari | G06F 21/31 |
| | | | | 382/181 |
| 2003/0110400 | A1 | 6/2003 | Cartmell et al. | |
| 2004/0254793 | A1* | 12/2004 | Herley | G10L 13/00 |
| | | | | 704/270 |
| 2005/0015257 | A1* | 1/2005 | Bronstein | G06Q 20/401 |
| | | | | 704/277 |
| 2005/0096906 | A1 | 5/2005 | Barzilay | |
| 2006/0136219 | A1 | 6/2006 | Wang | |
| 2007/0143624 | A1 | 6/2007 | Steeves | |
| 2009/0055193 | A1* | 2/2009 | Maislos | G06F 21/32 |
| | | | | 704/273 |
| 2009/0228271 | A1* | 9/2009 | DeSimone | G10L 13/10 |
| | | | | 704/231 |
| 2009/0249477 | A1* | 10/2009 | Punera | G06F 21/31 |
| | | | | 726/18 |
| 2009/0319270 | A1* | 12/2009 | Gross | G10L 15/22 |
| | | | | 704/246 |
| 2009/0319271 | A1* | 12/2009 | Gross | G10L 15/22 |
| | | | | 704/246 |
| 2009/0319274 | A1 | 12/2009 | Gross | |
| 2009/0328150 | A1* | 12/2009 | Gross | A63F 13/12 |
| | | | | 726/3 |
| 2010/0049526 | A1* | 2/2010 | Lewis | G10L 15/22 |
| | | | | 704/273 |
| 2010/0131267 | A1* | 5/2010 | Silbert | G10L 13/06 |
| | | | | 704/10 |
| 2010/0241417 | A1* | 9/2010 | Bassett | G06F 9/454 |
| | | | | 704/8 |
| 2012/0004914 | A1* | 1/2012 | Strom et al. | 704/246 |
| 2012/0090028 | A1* | 4/2012 | Lapsley | H04L 63/08 |
| | | | | 726/22 |
| 2012/0144455 | A1* | 6/2012 | Lazar | G06F 21/31 |
| | | | | 726/4 |
| 2012/0192252 | A1* | 7/2012 | Kuo | G06F 21/31 |
| | | | | 726/4 |
| 2012/0210393 | A1* | 8/2012 | Yamahara | G06F 21/31 |
| | | | | 726/2 |
| 2012/0232907 | A1* | 9/2012 | Ivey | G06F 21/30 |
| | | | | 704/273 |
| 2012/0249298 | A1* | 10/2012 | Sovio | G07C 9/00158 |
| | | | | 340/5.83 |
| 2012/0271630 | A1* | 10/2012 | Miki | G10L 13/033 |
| | | | | 704/225 |
| 2013/0019285 | A1* | 1/2013 | Barborak | G06F 17/27 |
| | | | | 726/4 |
| 2013/0019286 | A1* | 1/2013 | Barborak | G06F 17/27 |
| | | | | 726/4 |

FOREIGN PATENT DOCUMENTS

| | | |
|---|---|---|
| CN | 101059830 A | 10/2007 |
| CN | 101772781 A | 7/2010 |
| EP | 1643486 A1 | 4/2006 |

OTHER PUBLICATIONS

Bohr et al., ("Improving Auditory Captcha Security", Retrieved at ldrum.lib.umd.edulbitstream1190318666/3/Auditory+Captcha+Security+Final.pdf>>, Proceedings of Institute for Systems Research Technical Reports, Nov. 5, 2008, pp. 1-17.).*

Bohr, et al., "Improving Auditory Captcha Security", Retrieved at <<http://drum.lib.umd.edu/bitstream/1903/8666/3/Auditory+Captcha+Security+Final.pdf>>, Proceedings of Institute for Systems Research Technical Reports, Nov. 5, 2008, pp. 1-17.

Tam, et al., "Improving Audio Captchas", Retrieved at <<http://cups.cs.cmu.edu/soups/2008/SOAPS/tam.pdf<<, Jul. 23-25, 2008, Pages. 2.

Bigham, et al., "Evaluating Existing Audio Captchas and an Interface Optimized for Non-Visual Use", Retrieved at <<http://citeseerx.ist.psu.edu/viewdoc/download?doi=10.1.1.169.9373&rep=rep1&type=pdf>>, Proceedings of 27th international conference on Human factors in computing systems, Apr. 4-9, 2009, pp. 1829-1838.

Gao, et al., "An Audio Captcha to Distinguish Humans from Computers", Retrieved at <<http://ima.ac.uk/papers/ gao2010b.pdf>>, Proceedings of Third International Symposium on Electronic Commerce and Security, Jul. 29-31, 2010, pp. 265-269.

Kochanski, et al., "A Reverse Turing Test Using Speech", Retrieved at <<http://citeseerx.ist.psu.edu/viewdoc/download?doi=10.1.1.13.2474&rep=rep1&type=pdf >>, Proceedings of Interspeech, Sep. 16-20, 2002, pp. 4.

Toub, Stephen, "An asp.net Framework for Human Interactive Proofs", Retrieved at <<http://msdn.microsoft.com/en-us/library/ms972952.aspx#hip_aspnet_topic8>>, Sep. 2004, pp. 21.

"Supplementary Search Report Issued in European Patent Application No. 13749405.0", dated Apr. 7, 2015, 3 Pages.

"First Office Action and Search Report Issued in Chinese Patent Application No. 201380009453.4", dated Dec. 31, 2015, 14 pages.

"Second Office Action and Search Report Issued in Chinese Patent Application No. 201380009453.4", dated Sep. 2, 2016, 13 Pages.

* cited by examiner

AUDIO HUMAN INTERACTIVE PROOF BASED ON TEXT-TO-SPEECH AND SEMANTICS

BACKGROUND

A Human Interactive Proof (HIP), also known as CAPTCHA (Completely Automated Public Turing test to tell Computers and Humans Apart) differentiates a human user from automatic programming (i.e., a bot).

The goal of most HIP schemes is to prevent automated access by a computer, while allowing access by a human. Typically, this goal is addressed by providing a method for generating and grading tests that most people can easily pass, and that most computer programs cannot pass.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The text-to-speech audio Human Interactive Proof (HIP) technique described herein provides an audio HIP that employs text-to-speech technologies and semantics in creating an audio challenge to determine whether an unknown computer user is a human or a bot. In order to make a spoken sentence unrecognizable by a generic or customized Automatic Speech Recognition (ASR) system (typically used by bots to attempt to automatically decipher an audio HIP), the technique prevents the speech recognition mechanism of the ASR system from recognizing or learning from HIP samples generated by the technique. The technique does this by making spoken HIP sentences very different from the audio data used in training a model of the ASR system, and by varying the characteristics in the spoken HIP words or sentences. ASR systems are typically based on statistical models. The farther the HIP sentence is away from the training data distribution of the ASR model, the more difficult it is for the ASR system to recognize the word or sentence of the HIP.

The text-to-speech audio HIP technique described herein can apply spectral frequency warping, vowel duration warping, volume warping, background addition, echo addition, and time duration between words in generating a spoken HIP sentence through a Text-to-Speech (TTS) engine. The resulting tempo, pitch, and voice of the spoken sentence are therefore very different from the normal data used to train ASR systems. In addition, the technique employs a large set of text-to-speech parameters to allow the technique to change effects frequently or constantly to disable the use of previously used audio HIP challenges from being used to train a model of an ASR system to recognize HIP challenges generated by the technique.

One embodiment of the text-to-speech audio HIP technique described herein can add an additional mechanism to differentiate human users from bots: a sentence of the audio HIP challenge must be understood to pass the challenge. For example, the sentence can be a question or an instruction for which semantic understanding of the sentence posed as an audio challenge is required in order to respond correctly to the challenge. In this way, even if the previously described mechanism fails, i.e., an ASR system can recognize all of the words in the sentence used as the audio challenge, a bot may still not be able to pass the test without understanding the sentence. Semantic understanding of sentences is still considered a challenging Artificial Intelligence problem.

DESCRIPTION OF THE DRAWINGS

The specific features, aspects, and advantages of the disclosure will become better understood with regard to the following description, appended claims, and accompanying drawings where:

DETAILED DESCRIPTION

In the following description of the text-to-speech audio HIP technique, reference is made to the accompanying drawings, which form a part thereof, and which show by way of illustration examples by which the text-to-speech audio HIP technique described herein may be practiced. It is to be understood that other embodiments may be utilized and structural changes may be made without departing from the scope of the claimed subject matter.

1.0 Text-To-Speech Audio Hip Technique

The following sections provide an introduction to human interactive proofs (HIPs), an overview of the text-to-speech audio HIP technique described herein, as well as an exemplary architecture and exemplary processes for practicing the technique. Details of various embodiments of the technique are also provided.

1.1 Introduction to Human Interactive Proofs (HIPs)

A HIP, also known as CAPTCHA (Completely Automated Public Turing test to tell Computers and Humans Apart) differentiates a human user from automatic programming (i.e., a bot). The goal of most HIP schemes is to prevent automated access by a computer, while allowing access by a human. Typically, this goal is addressed by providing a method for generating and grading tests that most people can easily pass, and that most computer programs cannot pass.

There are many HIP schemes presently available. For example, one conventional visual scheme operates by randomly selecting characters or words from a dictionary, then rendering a distorted image containing the characters or words. This scheme then presents a test to its user which consists of the distorted image and a request to type some of the characters or words appearing in the image. By tailoring the types of deformations that are applied, an image is created wherein most humans can read the required number of characters or words from the distorted image, while current computer programs typically cannot.

In another audio HIP example, individual characters are spoken by humans. The spoken characters which are the same as an accompanying visual HIP are distorted and pieced together with a different time duration between letters. Background noise is also added. A user is asked to type the spoken letters.

In yet another audio HIP individual words are spoken, distorted and added with background noise. A user is asked to type in the spoken words. Some errors in the typed words are tolerable.

1.2 Overview of the Technique

The text-to-speech audio HIP technique described herein in some embodiments uses different (preferably non-repeating) sentences or words generated via a text-to-speech engine as audio HIP challenges. The technique can apply different effects in a text-to-speech synthesizer speaking a sentence or words to be used as a HIP. The different effects can include, for example, spectral frequency warping; vowel duration warping; volume warping, background addition; echo addition; and variation of the time duration between words, among others. In some embodiments the technique varies the set of parameters to generate audio HIP challenges over time and for the generation of different challenges in order to prevent an ASR from learning a model that can be used to recognize the audio HIP challenges generated by the technique. Additionally, in some embodiments the technique introduces the requirement of semantic understanding in order to solve the HIP challenges.

1.3 Exemplary Architecture

Figure 1:
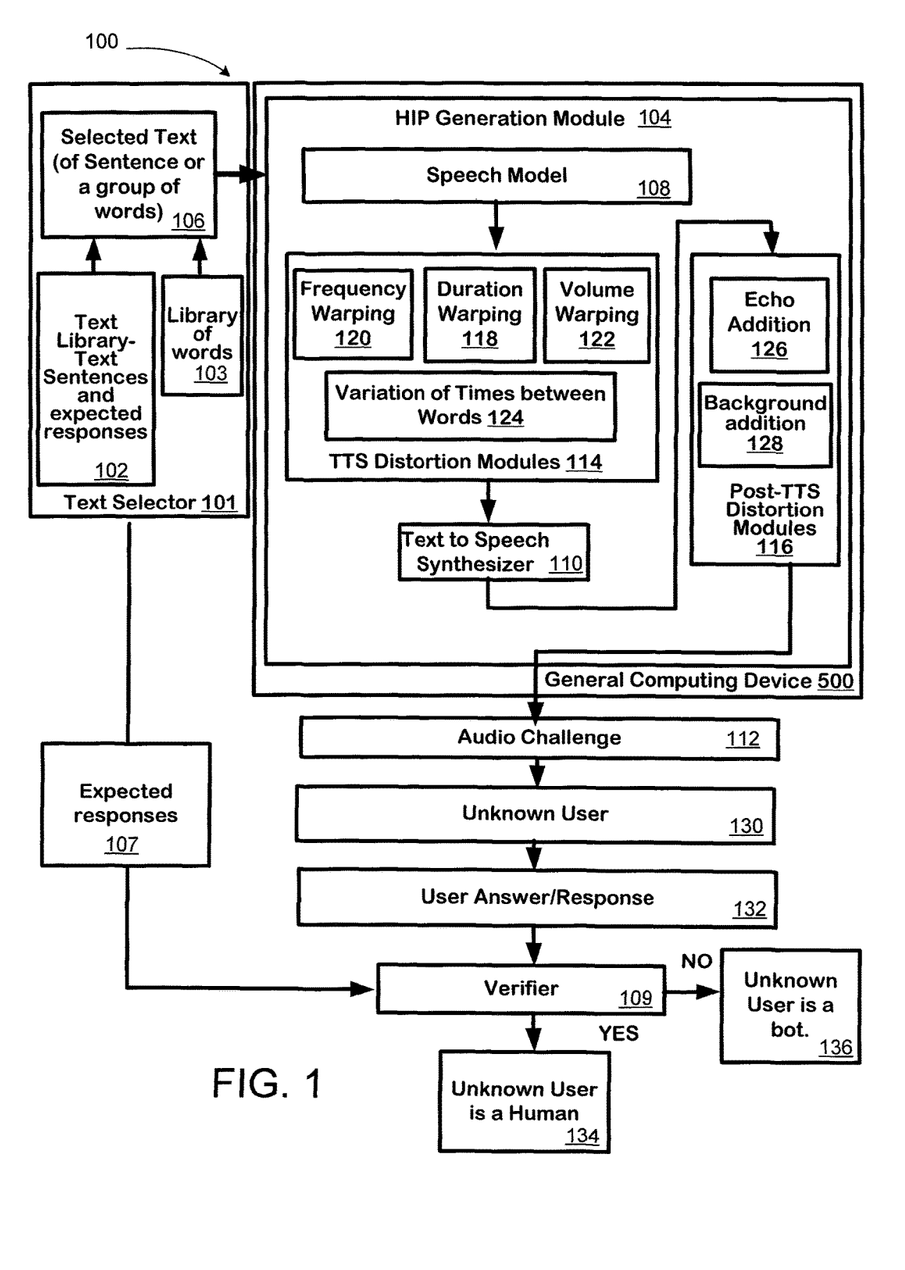
FIG. 1 is an exemplary architecture for practicing one exemplary embodiment of the text-to-speech audio HIP technique described herein.

FIG. 1 shows an exemplary architecture 100 for practicing one embodiment of the text-to-speech audio HIP technique. As shown in FIG. 1, this exemplary architecture 100 includes a text selector module 101 which may contain a library 102 of text (e.g., text sentences and expected responses) or library 103 of words. The module 101 selects and provides text 106 to the HIP generation module 104 and expected responses 107 to a verifier 109. In one embodiment, the text selector module 101 may select a specific item (e.g., preferably a text sentence and its expected response), either randomly or in a specific manner. The sentences in the text library 102 can be selected from documents or articles provided from a certain source, crawled from the Internet, or generated from a module (not shown in FIG. 1) based on specific rules or patterns. In some embodiments, expected responses are produced with the sentences. An expected response can be the sentence itself, or an answer that humans would provide in response to the sentence. The former is typically used when the sentence is produced from a document or article automatically. The latter is typically used when the sentence is produced by a program module.

In one embodiment, the text selector module 101 may contain a library of words from which a group of correlated or uncorrelated words can be selected, either randomly or in a certain manner. The selected words are used as the selected text 106 that is sent to the HIP generation module 104 and the words arranged in the same order as the selected text 106 are also used as the expected response 107 that is sent to the verifier 109.

The architecture includes an audio HIP generation module 104 which resides on the same or a different general computing device 500 as the text selector 101. The general computing device 500 will be discussed in greater detail with respect to FIG. 5. The HIP generation module 104 contains a TTS engine, TTS distortion modules 114 and post TTS distortion modules 116. A conventional TTS engine consists of two parts, a speech model 108 and a text to speech synthesizer 110. The TTS engine processes the selected text 106 using the speech model 108. Between the two TTS engine parts (the speech model 108 and the TTS synthesizer 110), TTS distortion modules 114 adjust the parameters as modeled by speech model 108 to apply one or more distortions so that the selected text 106 will be distorted when read by the text-to-speech synthesizer 110. The TTS output may be further processed by post-TTS distortion modules 116 to apply one or more additional distortions such as adding echo or background to the TTS generated spoken text. The resulting sound is used as an audio HIP/CATCHA 112. The distortions or distortion parameters defining one or more of the distortions in the TTS synthesizer 110 or post-TTS can be varied randomly or in a specific pattern with each instance of generating an audio challenge string.

The HIP generation module 104 determines the distortion parameters that are used to model the selected text using the speech model 108. In one embodiment this speech model 108 is a Hidden Markov Model (HMM) that is used to model the frequency spectrum (vocal tract), fundamental frequency (vocal source) and duration of the speech (prosody). The TTS distortion modules 114 inside the HIP generation module 104 can include a frequency warping module 120 that warps the frequency parameters of the selected text 106 when read by the text-to-speech synthesizer 110. The TTS distortion modules 114 can also include a module 118 for varying the durations of pronounceable sounds. For example, this module 118 can perform vowel duration warping that varies the time vowels of the selected sentence 106 are pronounced when read by the text-to-speech synthesizer 110. Additionally, the TTS distortion modules 114 can include a module 122 for varying the volumes of sounds and/or a module 124 to for varying the time duration between words when the text-to-speech synthesizer 110 generate a voice for the selected text 106.

After the voice of the selected text is generated by the text to speech synthesizer 110, one or more additional distortions can be applied with the post-TTS distortion modules 116. The post-TTS distortion modules 116 may include an echo addition module 126 to add echo effects and/or a background addition module 128 to add background sounds to a generated audio clip of the selected text 106 from the text to speech synthesizer 110.

Different background sounds can be added by the background addition module 128. In one embodiment, music can be added as background sounds. In another embodiment, another voice, referred to as background voice hereafter, can be added to the voice, referred to as foreground voice, of the selected text 106 from the text to speech synthesizer 110. Distortions and other modifications can be applied to the background sounds to produce additional variations on the background sounds for the same or different audio HIP challenges.

When voice is added, the background voice can be of the same language as the foreground voice. It can also be of a language different from the foreground voice's language. For example, when the foreground voice is English, the background voice can be Chinese or Spanish. The background voice can be generated with the TTS synthesizer 110, in a similar way as the foreground voice. Different distortions such as frequency warping and others mentioned above for the foreground voice can be applied during the generation of the background voice. The text of the background voice can be a sentence selected from a text library or words randomly selected from a dictionary. With an added background voice, humans can easily tell the difference between the two languages, and identify and recognize the foreground language, but a machine such as an ASR engine cannot differentiate the foreground voice from the background voice, and thus cannot recognize the spoken text of the foreground voice.

An audio challenge generated from the HIP generation module is sent to an unknown user 130 who can input a response with various methods, such as using a keyboard, a mouse, or a touch screen. In one embodiment, the unknown user 130 may speak a response, and voice recognition technologies are used to recognize the response and convert it to text. A received text response 132 is then sent to the verifier 109 which compares the received response with the expected response of the audio challenge. The verifier 109 identifies the unknown user 130 as human 134 if it determines that the response 132 from the unknown user matches the expected response 107. Otherwise the unknown user is identified as a bot 136. In one embodiment the unknown user 130 recognizes an audio challenge 112 to provide a correct response to pass the test. In another embodiment the unknown user 130 must have a semantic understanding of the audio challenge in order to provide a correct response to pass the test.

Many techniques can be used in the verifier 109 to determine if a received response 132 matches an expected response. In one embodiment, the verifier determines that the two responses match each other only when they match exactly. In this case, no error is tolerated. In another embodiment, the verifier determines that the two responses match each other if the error between the two responses is below a tolerance error. In one embodiment, the error between two responses is calculated using edit distance or its variations.

The verifier 109 may process a response before comparing it with the other response. For example, the verifier 109 may normalize the text of a response such as replacing a word or a string of text with its standard expression and remove insignificant words. The verifier 109 may also convert a text response to a string of phones, and compare strings of phones to determine if the two responses match each other or not. Many techniques can be used to convert text to phones. In one embodiment, the speech model in a TTS is used to convert text to phones.

1.4 Exemplary Processes for Practicing the Technique

Figure 2:
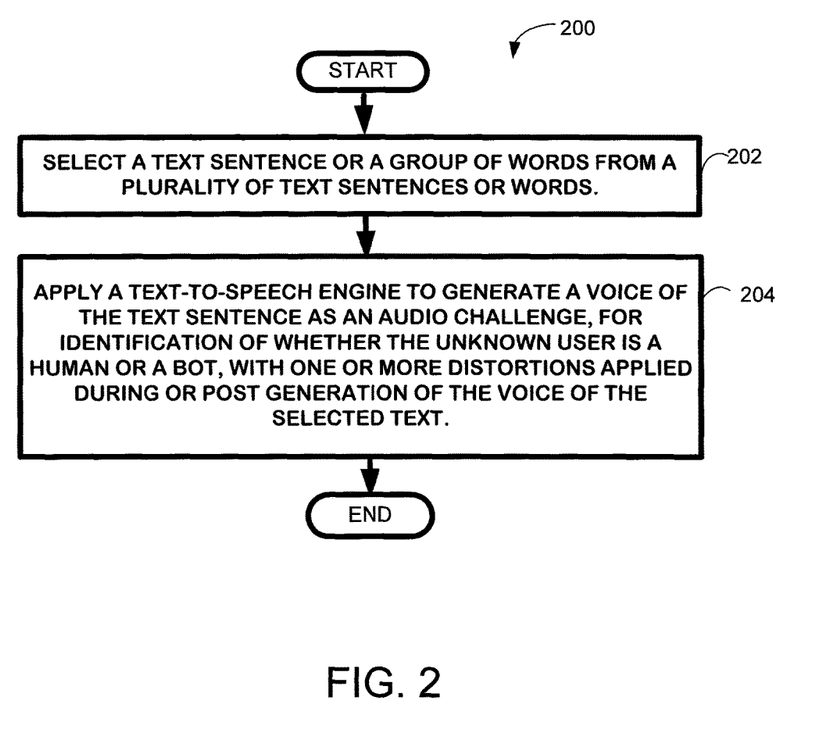
FIG. 2 depicts a flow diagram of an exemplary process for employing one embodiment of the text-to-speech audio HIP technique.

In general, FIG. 2 shows a general exemplary process for practicing one embodiment of the text-to-speech audio HIP technique described herein. As shown in block 202, a text sentence or a group of correlated or uncorrelated words is selected from a plurality of text sentences or a plurality of words. As shown in block 204, a text-to-speech engine is applied to generate the voice of the selected text as an audio challenge, for identification of whether an unknown user is a human or a bot, with one or more distortions applied during or post generation of the voice of the selected text.

Figure 3:
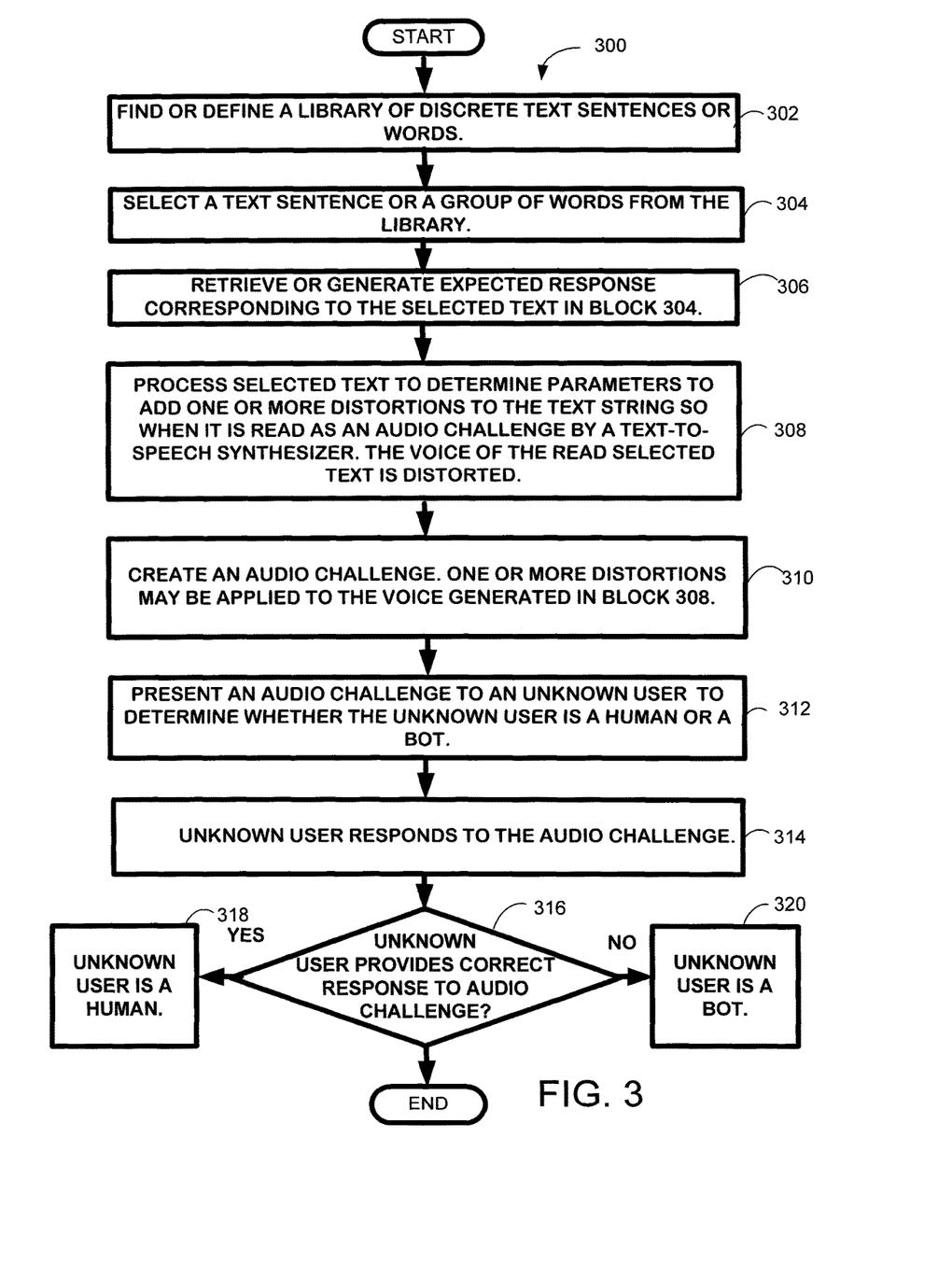
FIG. 3 depicts another flow diagram of an exemplary process for employing one embodiment of the text-to-speech audio HIP technique.

FIG. 3 shows a more detailed exemplary process 300 for practicing another embodiment of the text-to-speech audio HIP technique. In general, this embodiment of the text-to-speech audio HIP technique operates by first finding or defining a library of discrete text sentences or words, as shown in block 302. For example, the text sentences can be selected from various appropriate text sources. In one embodiment the text in the text library is non-repeating sentences that are automatically extracted from articles or documents that are easy for humans to understand, such as newspapers and magazines that aimed at ordinary human readers. In one embodiment, the length of extracted sentences is of a preset range. If a sentence is too short, it may be combined with the next sentence or simply dropped. A too long sentence may be cut into two or more smaller pieces to fit into the required length. The articles or documents may be provided from internal sources or crawled from the Internet. In another embodiment, the audio HIP technique builds or defines a library of words. This library can be built from a dictionary by removing insignificant words or confusing words. Words that are easy to be confused by humans by their spelling or by their sounds may be removed from the library. Given this library of text sentences or words, as shown in block 304, the technique automatically selects a text sentence from the library of text sentences or selects a group of correlated or uncorrelated words from the library of words for use in creating an audio challenge for determining whether an unknown user is a human or a bot. The technique may also retrieve the expected response from the library of the text sentences, if the response is stored in the library with the retrieved text sentence, or generates an expected response from the selected text sentences or group of correlated or uncorrelated words, as shown in block 306. In one embodiment, the generated expected response is the same as the selected string of text. In another embodiment, the generated expected response is the result after text normalization is applied to the selected text. Text normalization receives a text input and produces a text output which converts the input text into a standard format. For example, insignificant words such as "a", "an" may be removed, "I'm" may be replaced by "I am" during text normalization. (As will be discussed later, the expected response is sent to a verifier 316 to compare with the response from an unknown user 314 to determine if the unknown user 318 is a human or a bot 320.) The selected text is then automatically processed to determine parameters to add one or more distortions when the selected text is read by a text-to-speech synthesizer, as shown in block 308. One or more language models may be used in block 308 in determining the parameters. These distortions, discussed in greater detail below, can include spectral frequency warping, vowel duration warping, volume warping, warping of times between words.

Once the voice of the selected text is produced by the text-to-speech synthesizer in block 308, the technique creates an audio challenge in block 310. One or more additional distortions may be applied to the voice generated in block 308 during the creation of an audio challenge. These distortions may be adding echo, background voice or music. Distortions may be applied to the background music or voice before adding it to the voice generated in block 308. The background voice may be generated in a way similar to generation of the foreground voice, for example, by selecting a text sentence or a group of correlated or uncorrelated words from a library, and then applying a language model and a text-to-speech synthesizer to generate the background voice. Parameters may be determined and modified to apply one or more distortions when the voice is generated by the text-to-speech synthesizer. These distortions can be similar to the distortions applied inside TTS synthesizer during generation of the foreground voice. The background voice can be of different languages. In one embodiment, the added background voice is of the same language as that of the language of the foreground voice generated in block 308. In another embodiment, the added background voice is of a language different from the language of the foreground voice generated in block 308. The addition of distortions during and after generating of the voice using the TTS synthesizer serves to create an audio challenge that is relatively easy for a person to recognize, but difficult for a computer to recognize, and introduces variations among generated audio challenges.

Once an audio challenge is generated in block 310, the next step is to send and present the audio challenge to an unknown user for identification, as shown in block 312. The unknown user is then required to respond by typing or speaking a response to the audio challenge, as shown in block 314. It is noted that even when the expected response is the selected text string, an attacker cannot play the audio HIP challenge as the spoken response since speech recognition cannot correctly convert the spoken response to a text response that is used in the next block. As shown in block 316, this user's response is then compared to the expected response. In one embodiment, the user's response is spoken. Speech recognition techniques are applied to convert the spoken response to a text response before comparing to the expected response. Only if the typed response is determined to match the expected response, the unknown user is deemed to be a human (block 318). Otherwise the unknown user is deemed to be a bot (block 320). In one embodiment, the match is required to be exact. In another embodiment, the match does not have to be exact. Some mismatch between the two responses may be allowed. The user's response is still determined to match the expected response as long as the mismatch is within some predetermined error tolerance or threshold.

In determining if the user's response matches the expected response, the verifier in block 316 may normalize the responses to remove variations of same expressions before comparing the two responses. This normalization may remove insignificant characters or words, and replace one or more words with standard, equivalent words. For example, "I'm" may be replaced by "I am", and "intl." may be replaced by international. In yet another embodiment, the responses may be converted to strings of sounds, i.e., phones, and the comparison is based on the phones instead of the text.

Many techniques may be used in block 316 to calculate errors between two responses. In one embodiment, edit distance is used to calculate the errors between two strings of text or phones. The normalization stage mentioned in the paragraph above may be applied before calculating the edit distance. The calculation of the edit distance may be based on words or phones, or on characters. When the error is calculated on words, two words may be considered the same if one word is another's variation, such as plural form of the other word, or the difference between the two words is within some error tolerance range. When the error is calculated on phones, two similarly pronounced phones may be considered the same in calculating errors of two responses.

Figure 4:
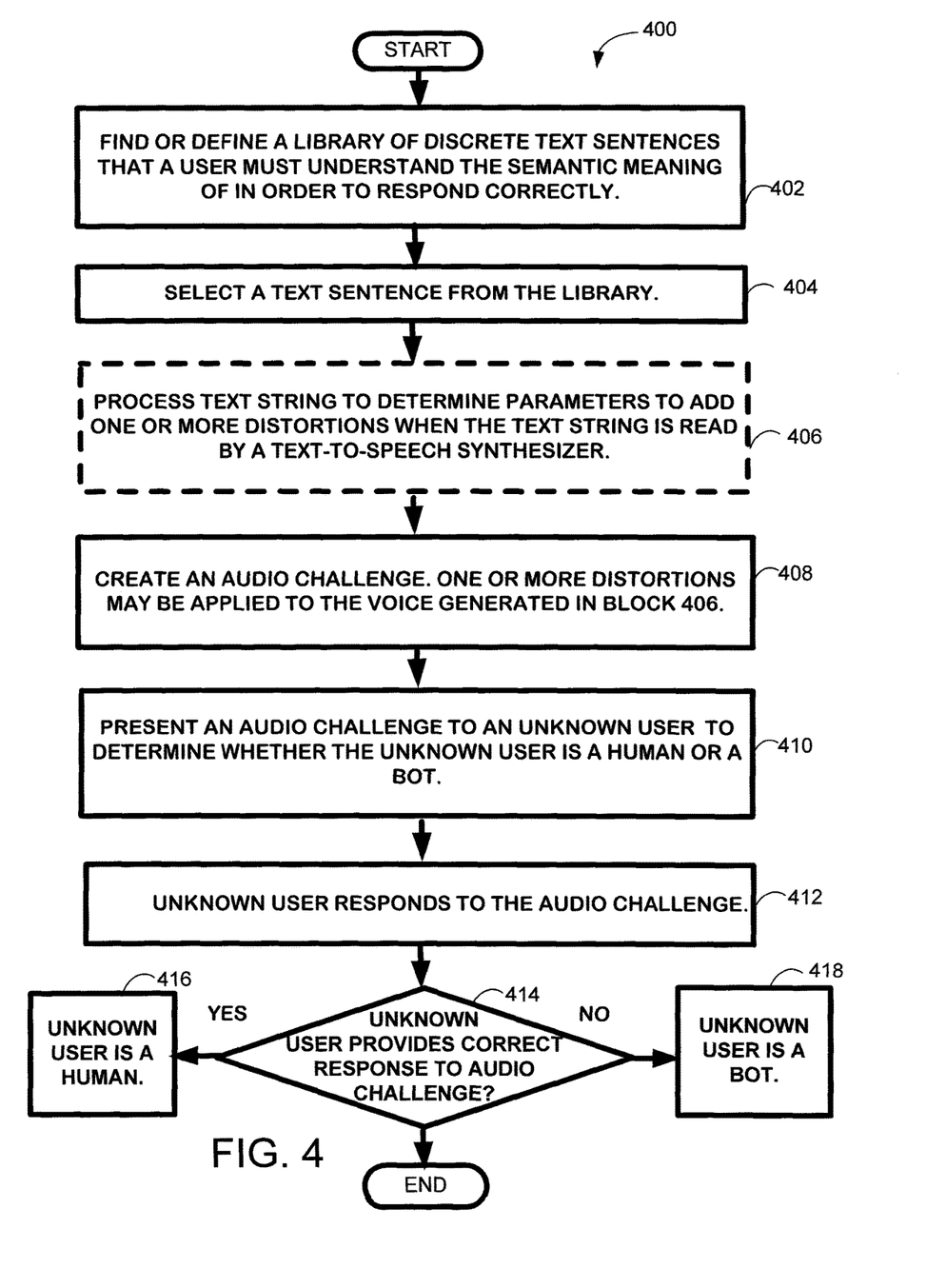
FIG. 4 depicts yet another flow diagram of an exemplary process for employing one embodiment of the text-to-speech audio HIP technique.

FIG. 4 shows yet another exemplary process 400 for practicing another embodiment of the text-to-speech audio HIP technique. In general, in this embodiment the technique operates by first defining a library of discrete text sentences and their expected answers that require a user to understand the semantic meaning of the sentence in order to provide a correct response to the sentence, as shown in block 402. In one embodiment, the text is non-repeating sentences that are automatically generated based on a preset set of rules. A text sentence in the library is typically an instruction or a question for which understanding of the sentence is required to provide a correct answer. For example, one set of rules may produce many questions regarding the addition or subtraction of items, where an item can be any common object such as, for example, an apple, a dog, or a plane. By using different numbers and items, many questions can be generated, such as "Simon ate three apples yesterday and has eaten two bananas today. What is the total number of fruits Simon has eaten since yesterday?" The subject, time, numbers, and item names can be changed to generate more questions. Another set of rules may produce many questions using multiplication and/or division, and/or addition and multiplication. As another example, a set of rules may generate a question by asking a user to input a response in a specific way, such as by providing a sentence and then asking a user to input the second letter of the spoken words in the reverse order, or to input the third word followed by its predecessor. This set of rules can also generate many questions. The text-to-speech audio HIP technique varies the pattern of the sentences generated by the same set of rules, and interleaves sentences generated using different sets of rules for generating audio HIP challenges in order to prevent bats from correctly classifying an audio HIP based on the set of rules used in generating the audio HIP challenges, or by knowing how to provide a correct response based on certain patterns or key words.

The text sentences are stored with their appropriate answers or expected responses. Given this library of text sentences, as shown in block 404, the technique automatically selects one or more text sentences from the library for use in creating an audio challenge to be used in determining whether an unknown computer user is a human or a bot. This selected sentence can then automatically be processed to determine one or more distortions that can be added when it is read by a text-to-speech synthesizer, as shown in block 406. These distortions, discussed in greater detail below include spectral frequency warping, vowel duration warping, volume warping, and variations of time between words. One or more additional distortions such as background addition and echo addition may be applied to the voice generated by the text-to-speech synthesizer in creating an audio HIP, as shown in block 408. It should be noted, however, that in one embodiment the sentence requiring semantic understanding is not distorted when or after the sentence is read by the text-to-speech synthesizer. The undistorted audio HIP challenge relies on a semantic understanding of the challenge to determine if an unknown user is a human or a bot. The semantic understanding prevents bots from providing a correct response.

The next step, as shown in block 410, is to present the audio challenge to the unknown party for identification. The unknown party is then required to respond to the sentence that requires semantic understanding, either by typing or speaking an appropriate response, as shown to block 412. A spoken response may be converted to a text response by applying speech recognition techniques. A response may be converted to a string of phones that represent how the response is pronounced. Normalization may be applied to a response to replace variations with standard ways to express the response, and insignificant characters or words may also be removed. The user's response is then compared to the expected response of the audio challenge to determine if they match or not, as shown in block 414. Only if the user's response is determined to match the expected response, the unknown user is deemed to be a human, as shown in block 416. Otherwise the unknown user is deemed to be a bot, as shown in block 418. In one embodiment, two responses are determined to match each other only if they match each other exactly. In another embodiment, two responses are determined to match each other if their error is within a tolerance range. Different techniques can be used to calculate the error of two responses, for example, edit distance or its variations. Many of the techniques described for the exemplary process shown in FIG. 3. may also be applied for the exemplary process described in FIG. 4.

1.5 Details of Various Embodiments of the Technique.

An exemplary architecture and exemplary processes for practicing the text-to-speech audio HIP technique having been described, the following paragraphs provide various details for implementing various embodiments of the technique.

1.5.1 Various Distortions can be Applied

As discussed above, one or more distortions may be applied during the creation of an audio challenge from the selected text. These distortions can be applied when and/or after generating the voice of the text. The distortions can be varied with each instance of producing an audio challenge. The text-to-speech audio HIP technique can employ spectral frequency warping, variation of pronounceable sounds such as vowel duration warping, variations of the volumes of the voice, and variations of the time between neighboring words when the selected text is read by a text-to-speech synthesizer, and/or by background addition and echo addition to the generated voice in creating an audio HIP challenge. Details of applying these and other distortions in creating an audio HIP challenge used to determine if an unknown user is a human or a bot are described below.

1.5.1.1 Spectral Frequency Warping

Many different types of frequency warping can be applied when the selected text is converted to voice to distort the generated voice in order to make it more difficult for a bot to recognize the audio challenge. For example, one or more frequency warping distortions can be applied during the generation of the audio challenge to distort the generated voice. In order to do this various warping functions and parameters are determined and are used to vary spectral frequency warping effects over time and over different audio challenges.

In one embodiment of the text-to-speech audio HIP technique, to perform spectral frequency warping, a warping function $\psi$ with parameter a is used, and $\alpha$ can change over time t. Meanwhile, a function $\hat{\omega} = \psi_{\alpha(t)}(\omega)$ is used to perform the transformation. The warping functions can be linear, piecewise linear, bi-linear or nonlinear. In one embodiment the text-to-speech audio technique described herein uses a bilinear frequency warping function based on a simple first order all-pass filter with unit gain, $$\psi_{\alpha(t)}(z) = \frac{z^{-1} - \alpha(t)}{1 - \alpha(t)z^{-1}}, \text{ or}$$

$$\Psi_{\alpha(t)}(\omega) = \omega + 2\tan^{-1}\frac{\alpha(t)\sin(\omega)}{1 - \alpha(t)\cos(\omega)},$$

where $|\alpha(t)|<1$.

In one embodiment warping parameter $\alpha(t)$ preferably changes smoothly over time. Thus, a sinusoidal function is used here as follows:

$$\alpha(t) = B + A \sin((k+t)/T*2*\pi)$$

where A, B and T are the warping range, warping center and warping period and are set either manually or varied within certain ranges, and where k is the initial phase and set to a value within [0, T−1], either randomly or non-randomly.

It should be noted that the above described warping function is one exemplary warping function that can be employed with the technique described herein. Various other warping functions can be used and these other warping functions or their parameters can also vary over time or can be applied smoothly over time.

1.5.1.2 Vowel Duration Warping

In one embodiment of the text-to-speech audio HIP technique, the duration of the pronunciation of pronounceable sounds is varied to distort the generated voice of the selected text string when the text is read by a text-to-speech synthesizer. For example, in one embodiment vowel duration warping is used to vary the durations of pronunciations of vowels in reading the selected text by the text-to-speech synthesizer. In this embodiment that employs vowel duration warping, the text-to-speech audio HIP technique first sets a minimum and maximum duration for each vowel which still can be perceived by persons, and then randomly adjusts vowel duration during the generation of the voice of the selected text by the text-to-speech synthesizer. It should also be noted that certain consonants can also be varied in a similar manner

1.5.1.3 Volume Warping

Volume warping can also be applied to change the volumes of pronounceable sounds when the selected text is read by the text-to-speech synthesizer. In one embodiment, a minimum volume and a maximum volume are set, and a random volume between the minimum and maximum volumes are applied to a pronunciation to apply the volume warping.

1.5.1.4 Varying Duration Between Words

The duration between two words can also be varied when the selected text is read by the text-to-speech synthesizer. In one embodiment, a minimum duration and a maximum duration are set, and a duration between the minimum duration and the maximum duration can be randomly selected and applied to the duration of two neighboring words. If the selected time duration is negative, the two neighboring words are pronounced with specified overlapping. This variation of durations between words may make it hard for an ASR system to segment a sentence into individual words.

1.5.1.5 Background and Echo Addition

The text-to-speech audio HIP technique may also add one or more distortions to the generated voice of the selected text. In some embodiments, background and echo may be applied to the voice read by the text-to-speech synthesizer. For example, the background can be noise, music, speech voice of the same or other language, and so forth. Echo can also be added to the generated voice of the selected text. For example, the percentage of decay, the time of delay and initial echo volume can be randomly set. Additionally, one or more distortions applied after generation of the voice of the selected text string can include adding another speech generated by a text-to-speech technique to the background of the voice of the text string to create an audio challenge. In one embodiment, this additional speech added to the background can be speech in a different language as that of the selected text string. The background speech may be selected to be a language that most targeted people of the generated audio challenge do not know. Humans may easily identify the speeches of different languages and focus on the foreground speech that a human user knows. Bots may have a difficulty to separate the foreground speech from the background speech, and thus cannot recognize the foreground speech. In another embodiment, the background speech can be of the same language as the foreground speech. The background speech can be generated by reading a sentence or a group of correlated or uncorrelated words with a text-to-speech synthesizer. The volume of the background speech may be varied in an appropriate range to make the foreground speech can be easily identified by humans. One or more distortions may be applied when the added background. For example, one or more distortions may be applied to the added background speech when or after the background speech is read by a text-to-speech synthesizer. These distortions may include, but are not limited to frequency warping, duration warping of pronounceable sounds, volume warping, and variations of durations between words. One or more distortions may be applied to the background speech generated by a text-to-speech synthesizer. For example, echo may be added to the background speech before it is added to the foreground speech. Furthermore, the background speech can be in the form of meaningless speech or recorded audio. In the embodiment that the background speech is of the same language as the background speech, meaningless background speech can help humans identify and recognize the foreground speech.

1.5.2 Text Used in a Audio HIP Challenge

In some embodiments of the text-to-speech audio HIP technique, each audio HIP challenge is a sentence spoken via a text-to-speech synthesizer. One simple embodiment of the text-to-speech audio HIP technique randomly selects a sentence of appropriate length of words, typically within a specific range, from an article and uses the text-to-speech synthesizer to speak out the selected sentence. In other embodiments, an audio HIP challenge is a string of correlated or uncorrelated words spoken via a text-to-speech synthesizer. These words may be selected from a library of words, built from a dictionary by removing words that may confuse humans when human recognize these words, and insignificant words.

The technique presents an audio challenge to an unknown user and asks the unknown user to type or speak a response to the audio challenge. In some embodiments, the unknown user is asked to respond with the sentence or the string of words as he or she heard. This is typically used when semantic understanding of the selected text is not needed. The unknown user needs only to recognize correctly the spoken sentence or string of words. These embodiments have an advantage that can easily generate audio HIP challenges of different languages. In other embodiments, the unknown user needs to understand the spoken sentence to provide a correct response. The sentence is typically an instruction or a question generated automatically with one or more sets of rules. These embodiments have an advantage that additional security level is applied in the generated audio challenges. An unknown user needs not only to recognize correctly the spoken sentence but also understand the sentence correctly in order to provide a correct response. When semantic understanding is required to respond an audio challenge, the expected answer is typically generated with the sentence, and stored together with the sentence in a library.

1.5.3 Semantic Understanding

While many of the above audio HIP challenges generated by the technique do not require semantic understanding of the sentences used as an audio challenge, in some embodiments of the text-to-speech audio HIP technique an additional mechanism can be added to help differentiate humans from bots. In this case, understanding of the sentence of an audio HIP challenge is required to pass the test. This sentence can be a question or an instruction. For example, in some embodiments the technique defines a plurality of categories of questions or instructions based on the types of a question or instruction. One or more rules may be associated with each category to help generate text sentences and their expected answers automatically. Semantic understanding of such a sentence is required to provide a correct response. Humans understand the sentence, and thus can easily provide a correct answer. Bots, on the other hand, don't have the capability to understand the sentence, and thus cannot provide a correct answer. Therefore the sentence itself is a HIP challenge. If the sentence is used as the selected text to generate an audio challenge, even if the bots recognize the audio challenge's text correctly, they still cannot provide a correct response and pass the HIP test since they do not understand the semantic meaning of the sentence. Additional types of questions and instructions can be added to the system. In one embodiment, a category is that an expected response is a specific string of characters or words based on a sentence. For example, it can be a randomly selected sentence followed by an instruction to ask a user to input the second letter of the words in the previous sentence, or input the last two words in the reverse order, etc. The set of rules associated with the category determine different types of instructions (and thus different expected responses for the same selected sentence) and different ways to state equivalent instructions which produce the same expected response. Since both don't understand the instruction, they would not be able to provide a correct response. Once such a composite sentence (a randomly selected sentence plus the following instruction) is generated, the expected response is also generated. The expected response or responses can be added into a library that will be selected later in generating an audio HIP challenge. In another embodiment, a category to be used while an expected answer is a specific calculation result. For example, the set of rules associated with the category is to generate different questions related to calculation results and different ways of expressions that produce the same calculation result. For example, a generated sentence may be: "Simon ate three apples yesterday and has eaten two bananas today, which day did he eat more fruits in terms of units of fruit?" The expected answer to this sentence is also automatically generated. By varying the subject, time, the question to ask, and equivalent ways to state a same thing, the technique can generate a plurality of sentences and their expected responses.

Figure 5:
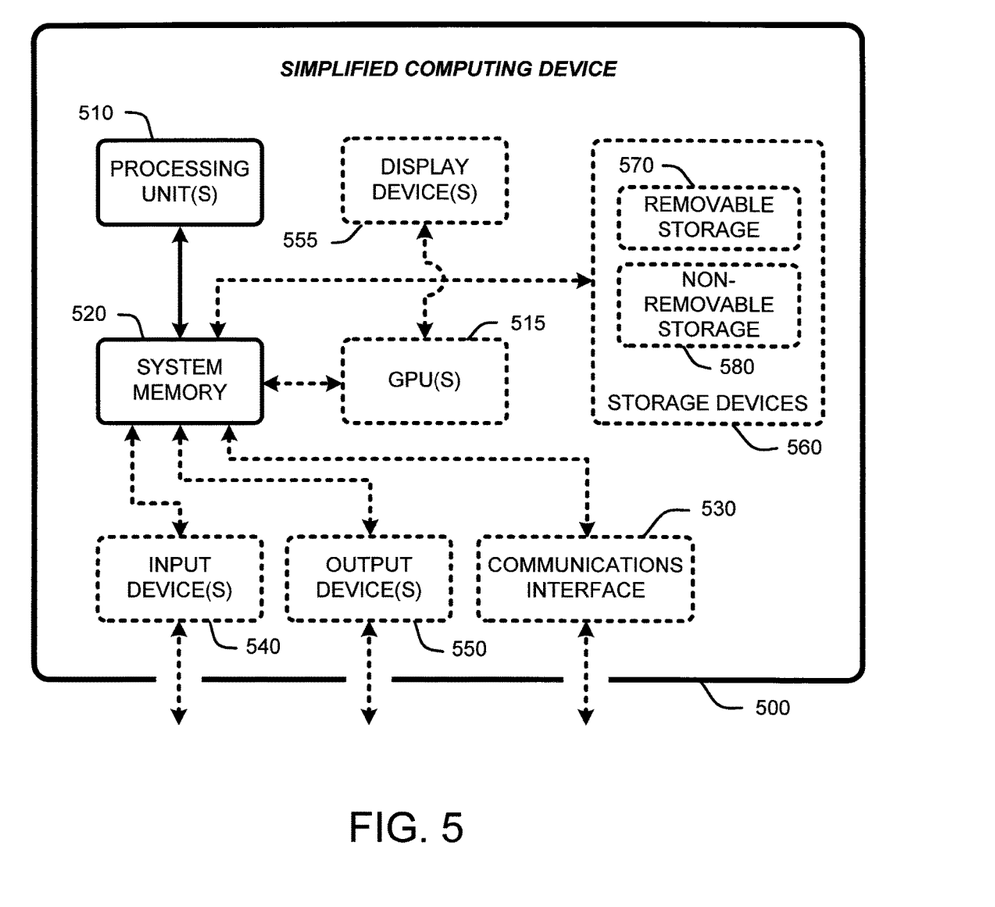
FIG. 5 is a schematic of an exemplary computing environment which can be used to practice the text-to-speech audio HIP technique.

2.0 Exemplary Operating Environments:

The text-to-speech audio HIP technique described herein is operational within numerous types of general purpose or special purpose computing system environments or configurations. FIG. 5 illustrates a simplified example of a general-purpose computer system on which various embodiments and elements of the text-to-speech audio HIP technique, as described herein, may be implemented. It should be noted that any boxes that are represented by broken or dashed lines in FIG. 5 represent alternate embodiments of the simplified computing device, and that any or all of these alternate embodiments, as described below, may be used in combination with other alternate embodiments that are described throughout this document.

For example, FIG. 5 shows a general system diagram showing a simplified computing device 500. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement the text-to-speech audio HIP technique, the device should have a sufficient computational capability and system memory to enable basic computational operations. In particular, as illustrated by FIG. 5, the computational capability is generally illustrated by one or more processing unit(s) 510, and may also include one or more GPUs 515, either or both in communication with system memory 520. Note that that the processing unit(s) 510 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 5 may also include other components, such as, for example, a communications interface 530. The simplified computing device of FIG. 5 may also include one or more conventional computer input devices 540 (e.g., pointing devices, keyboards, audio input devices, video input devices, haptic input devices, devices for receiving wired or wireless data transmissions, etc.). The simplified computing device of FIG. 5 may also include other optional components, such as, for example, one or more conventional computer output devices 550 (e.g., display device(s) 555, audio output devices, video output devices, devices for transmitting wired or wireless data transmissions, etc.). Note that typical communications interfaces 530, input devices 540, output devices 550, and storage devices 550 for general-purpose computers are well known to those skilled in the art, and will not be described in detail herein.

The simplified computing device of FIG. 5 may also include a variety of computer readable media. Computer readable media can be any available media that can be accessed by computer 500 via storage devices 560 and includes both volatile and nonvolatile media that is either removable 570 and/or non-removable 580, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the text-to-speech audio HIP technique described herein, or portions thereof, may be stored, received, transmitted, or read from any desired combination of computer or machine readable media or storage devices and communication media in the form of computer executable instructions or other data structures.

Finally, the text-to-speech audio HIP technique described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

It should also be noted that any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

What is claimed is:

1. A computer-implemented process for providing an automatic human interactive proof, comprising:
   selecting a single text sentence from a plurality of text sentences, and a question, wherein the selected single text sentence by itself provides information that is employed by an unknown user to formulate an answer to the question, wherein the single text sentence is different from the question;
   creating an audio challenge comprising the selected single text sentence and the question, the audio challenge requiring semantic knowledge of the question to respond;
   sending an oral rendition of the audio challenge to the unknown user;
   receiving audio data representing a response to the audio challenge from the unknown user; and
   analyzing the audio data to determine whether the unknown user is a human or a bot.

2. The computer-implemented process of claim 1, wherein the received response is spoken by the unknown user, and wherein voice recognition is applied to recognize the received response and compare the received response with a correct answer.

3. The computer-implemented process of claim 2, wherein the correct answer is automatically generated.

4. The computer-implemented process of claim 1, wherein the oral rendition of the audio challenge is generated by a text-to-speech engine, and wherein one or more distortions are applied during or post generation of the oral rendition of the audio challenge.

5. The computer-implemented process of claim 4, wherein the one or more distortions are applied during the generation of the oral rendition of the audio challenge and comprises applying spectral frequency warping.

6. The computer-implemented process of claim 4, wherein the one or more distortions are applied during the generation of the oral rendition of the audio challenge and comprises adjusting durations between spoken words.

7. The computer-implemented process of claim 4, wherein the one or more distortions are applied during the generation of the oral rendition of the audio challenge and comprises changing volumes of pronounceable sounds of the oral rendition of the audio challenge, said volume of each pronounceable sound being distorted varying between a maximum volume and a minimum volume.

8. The computer-implemented process of claim 4, wherein the one or more distortions are applied after the generation of the oral rendition of the audio challenge and comprises adding echo.

9. The computer-implemented process of claim 4, wherein the one or more distortions are applied after generation of the oral rendition of the audio challenge and comprises adding sounds as background.

10. The computer-implemented process of claim 9, wherein the added background sounds are an additional speech generated by a text-to-speech synthesizer.

11. The computer-implemented process of claim 10, wherein the additional speech added to the background is speech in a different language as that of the selected text.

12. The computer-implemented process of claim 10, wherein the one or more distortions are added as additional speech are in a form of meaningless speech or recorded audio.

13. The computer-implemented process of claim 4, wherein the one or more distortions applied during the generation comprises adjusting durations of pronounceable sounds during the generation of the voice of the selected text to create the audio challenge.

14. The computer-implemented process of claim 1, wherein the audio challenge question is automatically generated based on a pre-set set of rules.

15. A system for generating an audio-based challenge for an automated human interactive proof, comprising:
a general purpose computing device;
a computer program comprising program modules executable by the general purpose computing device, wherein the computing device is directed by the program modules of the computer program to,
select a single text sentence and a question to be used as a challenge string for which semantic understanding of the challenge string is necessary to respond to the question, wherein the selected single text sentence by itself provides information that is employed by an unknown computer user to formulate an answer to the question, wherein the single text sentence is different from the question;
distort parameters of a speech model of the selected single text sentence and the question with one or more distortions so that the selected single text sentence and the question are distorted when read by a text-to-speech engine;
using the distorted parameters and the speech model, read the selected single text sentence and then the question such that together they form an audio challenge to the unknown computer user using a text-to-speech synthesizer; and
automatically determine if a response received from the unknown computer user matches an expected response, said response being an answer to the audio challenge that a human with semantic knowledge provides and which is not a repeat of the audio challenge itself.

16. A computer-implemented process for determining whether an unknown computer user is a human, comprising:
using a computer to perform following process actions:
creating an audio challenge comprising a single text sentence and an instruction concerning the single text sentence, said single text sentence by itself providing information that is employed by the unknown computer user to formulate a response to the audio challenge, the audio challenge requiring semantic knowledge thereof to respond, wherein the single text sentence is different from the instruction;
sending an oral rendition of the audio challenge to the unknown computer user;
receiving audio data representing the response to the audio challenge from the unknown computer user;
analyzing the audio data to determine if the response was generated by a human, said response being an answer to the audio challenge that a human with semantic knowledge provides and is not a repeat of the audio challenge itself.

17. The computer-implemented process of claim 16, further comprising applying one or more distortions to the oral rendition of the audio challenge.

18. The computer-implemented process of claim 17, wherein the one or more distortions comprise spectral frequency warping, warping of durations between spoken words, adding echo, adding background sounds comprising noise, music, or another speech of the same or different language as of that of the oral rendition of the audio challenge.

19. The computer-implemented process of claim 17, wherein the one or more distortions comprises adjusting durations of pronounceable sounds of the oral rendition of the audio challenge.

20. The computer-implemented process of claim 17, wherein the one or more distortions comprises changing volumes of pronounceable sounds of the oral rendition of the audio challenge, said volume of each pronounceable sound of the oral rendition being distorted varying between a maximum volume and a minimum volume.

* * * * *